United States Patent
Darling (12)

(10) Patent No.: US 8,739,176 B1
(45) Date of Patent: May 27, 2014

(54) TASK-DRIVEN MULTITASKING METHOD THAT CONSTRAINS TASK SUSPENSION TO TASK PREEMPTION

(76) Inventor: Sumner E. Darling, Sarasota, FL (US)

(*) Notice: Subject to any disclaimer, the term of this patent is extended or adjusted under 35 U.S.C. 154(b) by 670 days.

(21) Appl. No.: 12/660,910

(22) Filed: Mar. 5, 2010

(51) Int. Cl.
*G06F 9/46* (2006.01)

(52) U.S. Cl.
USPC .......................................... 718/107; 718/103

(58) Field of Classification Search
None
See application file for complete search history.

(56) References Cited

U.S. PATENT DOCUMENTS 5,590,332 A * 12/1996 Baker ........................... 717/151
6,823,517 B1    11/2004 Kalman
7,280,558 B1 * 10/2007 Grunkemeyer et al. ...... 370/466

OTHER PUBLICATIONS

A Run-Time Environment Supporting Real-Time Execution of Embedded Control Applications Krzysztof Sierszecki, Christo Angelov, Xu Ke Published: 2008.*
Preventing lost messages in event-driven programming Jeffrey Fischer, Rupak Majumdar, and Todd Millstein UCLA CSD Technical Report TR060001; pp. 1-15 Published: 2006.*
Control Transfer in Operating System Kernels Richard Draves pp. i, 1-14 Published: 1994.*
Single Kernel Stack L4 Matthew Warton Published: 2005.*
Recycling Continuations Jonathan Sobel Daniel P. Friedman Published: 1998.*
Salvo User Manual version 3.2.2 Andrew Kalman selected pages Published: 2003.*
Kernel Implementation of Monitors for Erika Sathish Kumar R. Yenna selected pages Published: 2003.*
PicOS: A Tiny Operating System for Extremely Small Embedded Platforms E. Akhmetshina, P. Gburzynski and F. Vizeacoumar Published: 2003.*
Teapot: Language Support for Writing Memory Coherence Protocols Satish Chandra, Brad Richards, and James R.Larus Published: 1996.*
Using Preemption in Event Driven Systems with a Single Stack Karsten Walther, Reinhardt Karnapke, Andre Sieber and Jorg Nolte Published: 2008.*
Tatham, Simon, Coroutines in C, http://www.chiark.greenend.org.uk/~sgtatham/coroutines.html.
Dunkels, A., et al., Using Protothreads for Sensor Node Programming.
Dunkels, A., et al., Protothreads: Simplifying Event-Driven Programming of Memory-Constrained Embedded Systems.
Downey, Allen B., The Little Book of Semaphores, Version 2.1.5, Chapter 3, pp. 11-15.
Samek, Miro and Ward, R., Build a Super Simple Tasker, Embedded Systems Design, Jul. 2006, pp. 18-37.

* cited by examiner

*Primary Examiner* — Emerson Puente
*Assistant Examiner* — Paul Mills
(74) *Attorney, Agent, or Firm* — Charles J. Prescott, P.A.

(57) ABSTRACT

While preemptive multitasking has been available for task-driven methods that use multiple call stacks and even-driven methods that use a single call stack, an embodiment of a new method teaches how preemptive multitasking may be achieved in a single call stack for task-driven applications. The new method requires significantly less memory and processing overhead than required to manage multiple call stacks and provides a significant reduction in transition states and lines of application code than required for event-driven methods. The method comprises providing a single call stack, providing a preemptive scheduler, providing a wait operation which is followed by a return to the scheduler, wherein execution context is not preserved, and providing a signal operation which may be invoked synchronously from a task handling function and/or asynchronously from an interrupt routine, whereby the scheduler is invoked and execution context is preserved and subsequently restored by the single call stack.

20 Claims, 8 Drawing Sheets

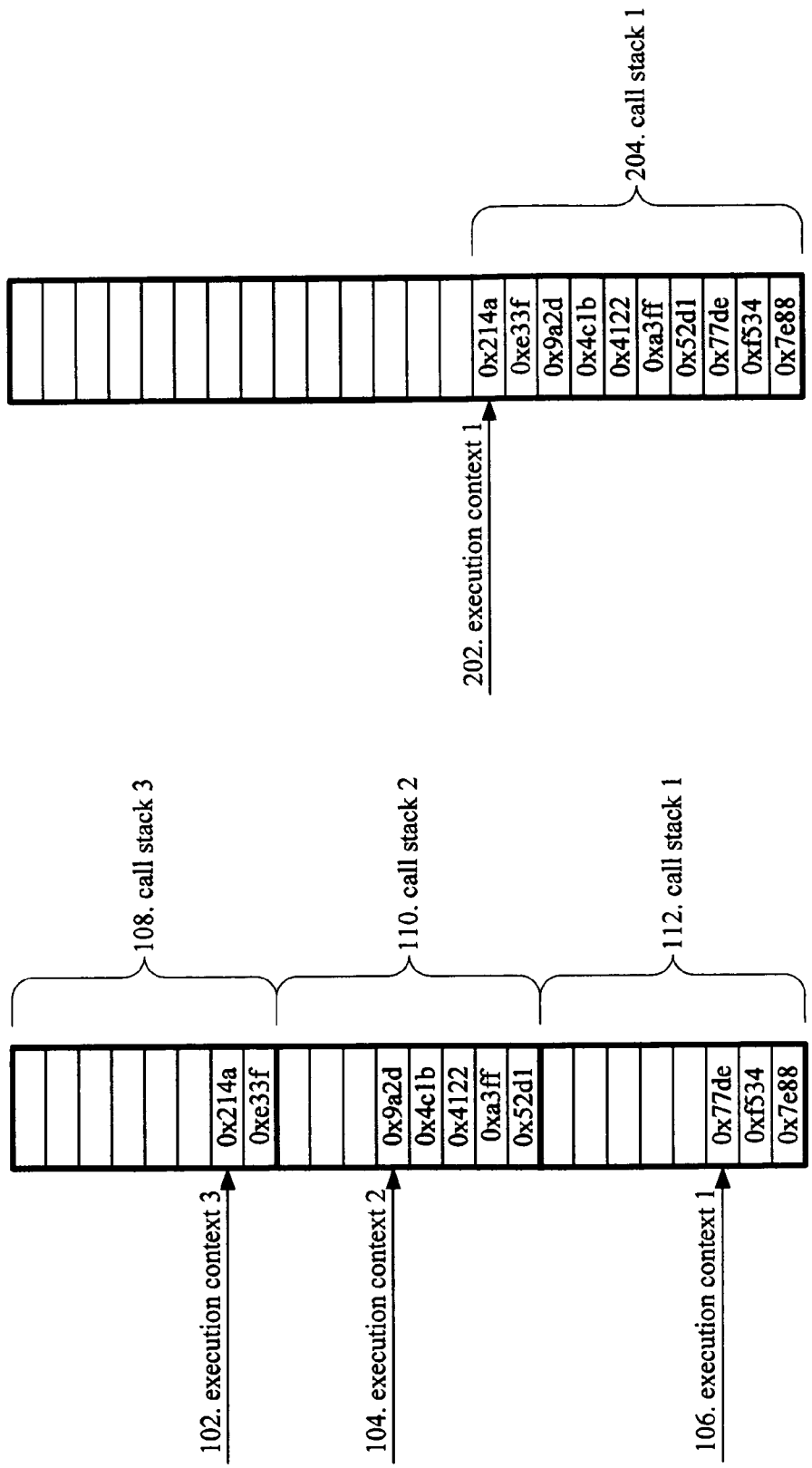

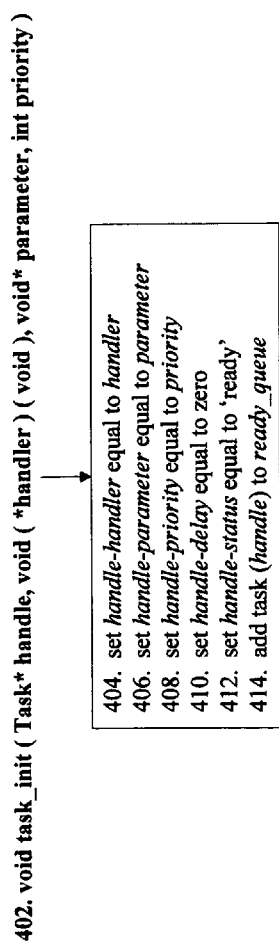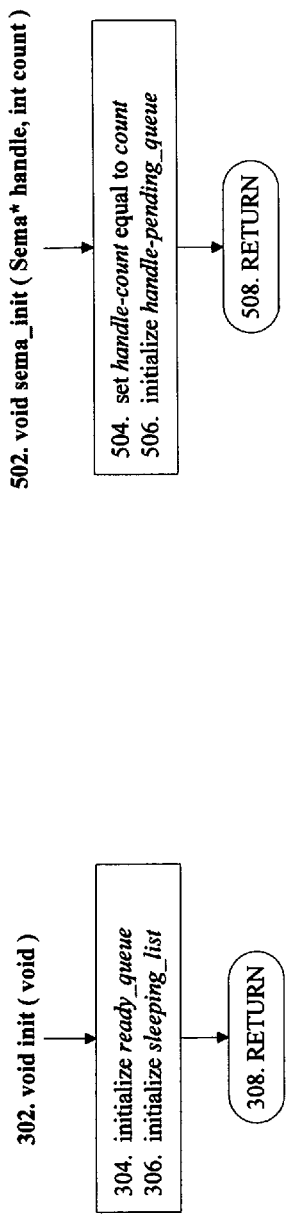

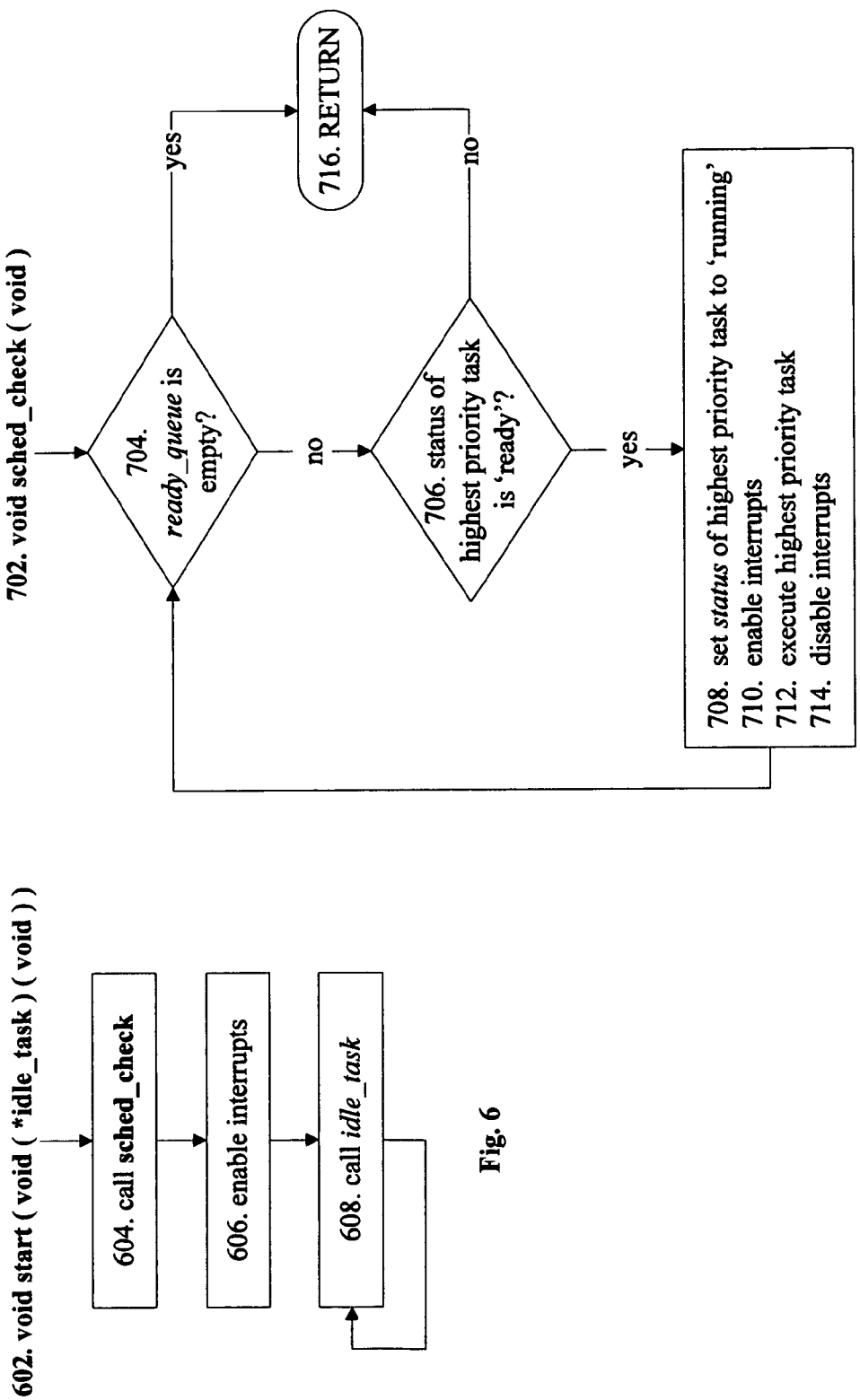

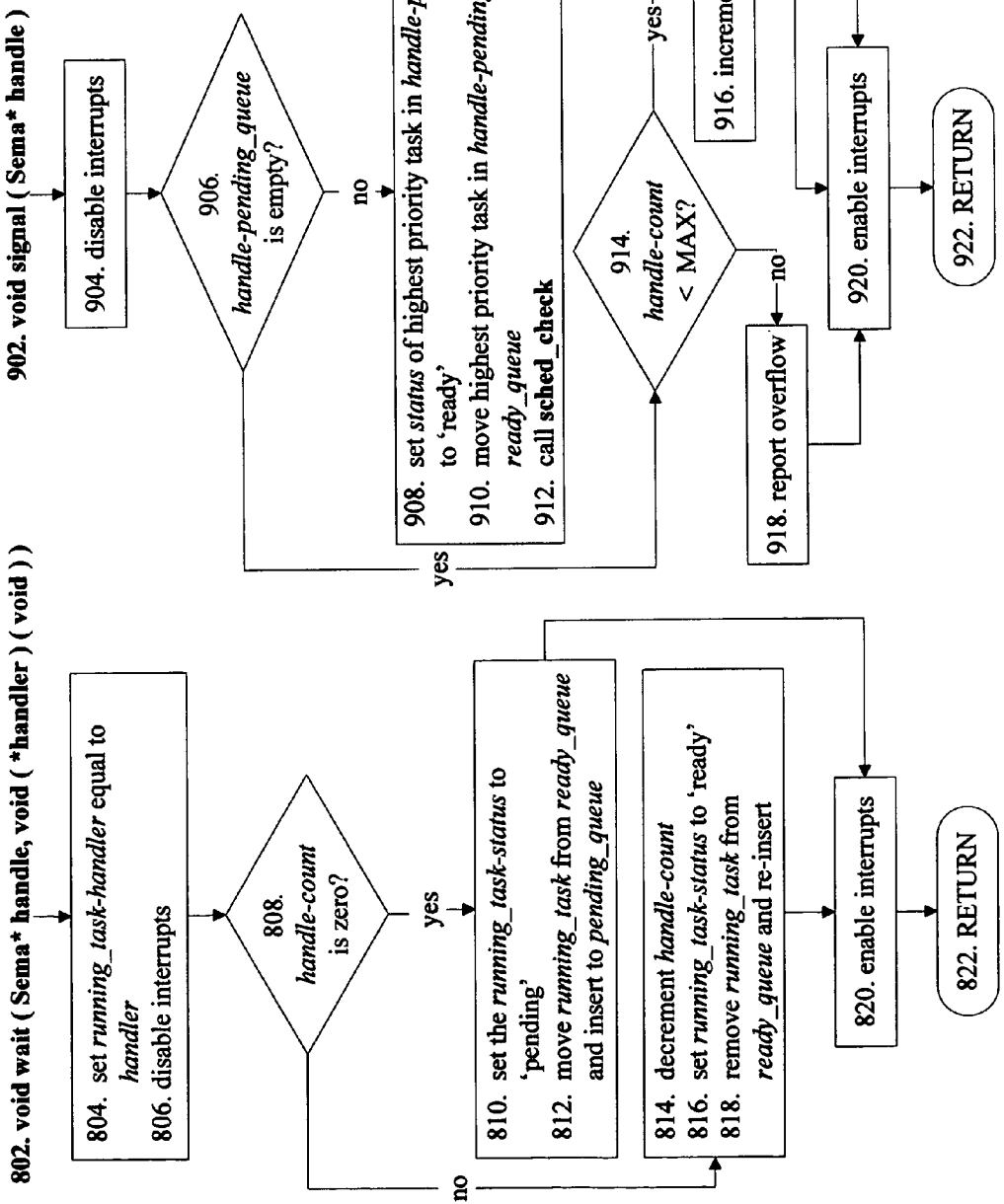

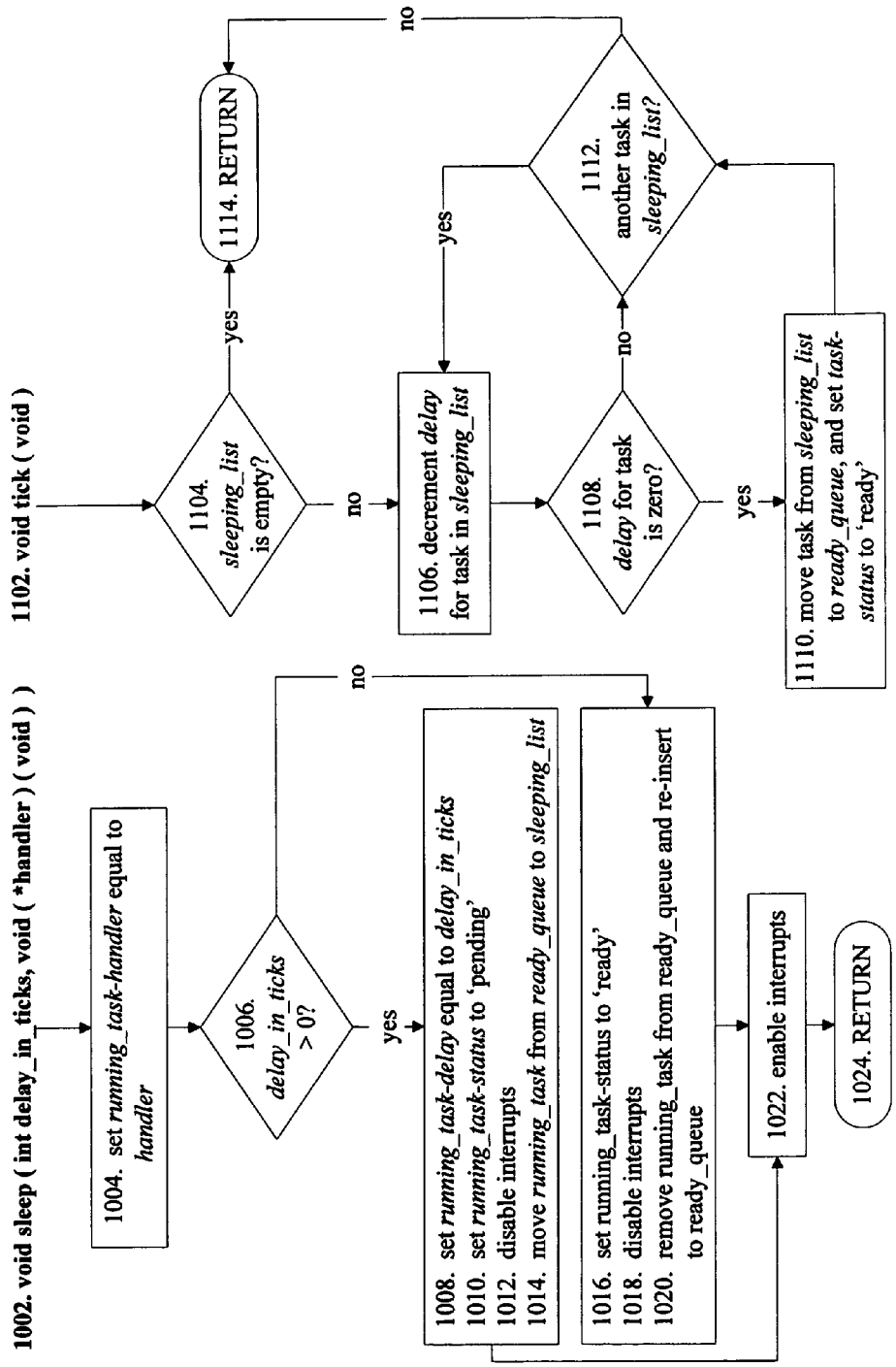

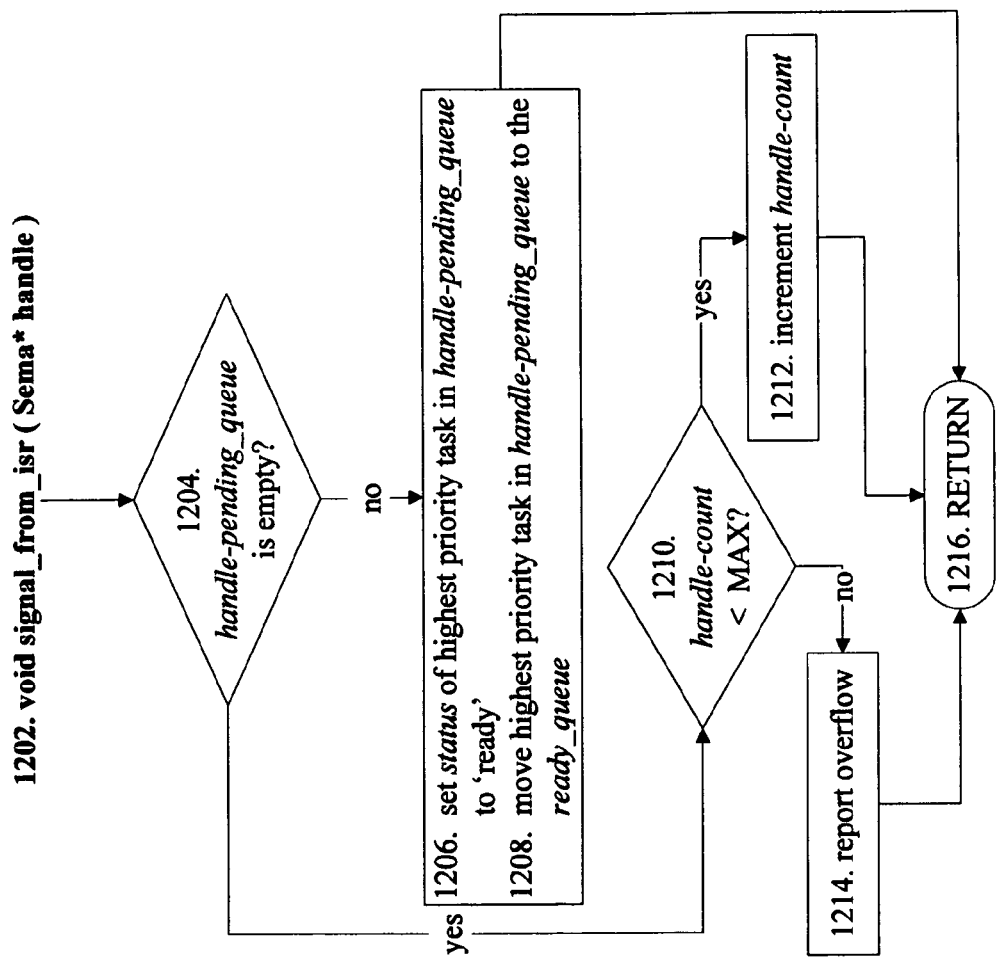

TASK-DRIVEN MULTITASKING METHOD THAT CONSTRAINS TASK SUSPENSION TO TASK PREEMPTION

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

A computer program listing appendix is submitted herewith on a single compact disc (in duplicate). The material contained on the compact disc is incorporated herein by reference. The files included on the compact disc are as follows:

| File Name | Size | Date of Creation |
|---|---|---|
| darling.c | 7,439 bytes | Feb. 12, 2010 |
| darling.h | 4,160 bytes | Feb. 12, 2010 |
| list.c | 2,389 bytes | Feb. 12, 2010 |
| list.h | 2,099 bytes | Feb. 12, 2010 |
| node.c | 1,805 .bytes | Feb. 12, 2010 |
| node.h | 3,341 bytes | Feb. 12, 2010 |
| port.h | 1,882 bytes | Feb. 12, 2010 |
| pque.c | 5,573 bytes | Feb. 12, 2010 |
| pque.h | 2,133 bytes | Feb. 12, 2010 |

BACKGROUND OF THE INVENTION

1. Field of the Invention

This invention relates generally to computer multitasking, specifically to a multitasking method for microcomputers that support a call stack, either in hardware or via software.

2. Description of Related Art

Multitasking methods are widely used in the industry of software development. These methods are often packaged as a software library, whose services are available to software applications via an application programming interface (API). They enable software developers to divide and conquer complex problems into several manageable tasks. They allow a microcomputer to perform several tasks seemingly simultaneously by switching back and forth between tasks. The prior art includes (1) preemptive, task-driven multitasking methods, (2) non-preemptive, task-driven multitasking methods, and (3) preemptive, event-driven multitasking methods. Examples of each of these methods are presented, and their call stack usage and respective disadvantages are explained.

A typical real-time operating system (RTOS) is an example of a preemptive, task-driven multitasking method. Preemptive means lower priority tasks may be interrupted in order to service higher priority tasks. And task-driven means the flow of an application is specified by its application code (the program using the RTOS). An introduction to RTOS theory and design is provided by Jean Labrosse in his book, *MicroC/OS-II: The Real-Time Kernel, 2nd Edition,* CMP Books 2002.

Coroutines are used to implement non-preemptive, task-driven multitasking methods. Non-preemptive means that lower priority tasks cannot be interrupted to service higher priority tasks. Rather, a higher priority task scheduled while a lower priority task is executing must wait until the lower priority task has completed. Another term often used to describe coroutines is cooperative. An introduction and implementation of coroutines is provided in the article, "Coroutines in C" by Simon Tatham in 2000 (www.chiark.greenend.org.uk/~sgtatham/coroutines.html).

A run-to-completion (RTC) kernel is an example of a preemptive, event-driven multitasking method. (For the purposes of this document, the terms kernel and operating system may be used interchangeably.) Run-to-completion means the task code cannot suspend its own execution prior to completion. Event-driven means the flow of an application is determined by the occurrence of events. For example, when an event occurs, it drives the execution of certain task code. An introduction and explanation of a typical RTC kernel is provided by Miro Samek and Robert Ward in their article "Build a Super Simple Tasker," Embedded Systems Programming, July 2006.

Multitasking methods typically employ a call stack to store return addresses and local variables for hierarchal functions and subroutines called for in software. Call stack usage varies considerably, depending on the multitasking method employed. An RTOS typically allocates a call stack for each and every task, whereas coroutines or an RTC kernel may employ a single call stack for use by all tasks. Another component required to support a call stack is an execution context. For each call stack supported by a multitasking method, a corresponding execution context maintains where each task is currently operating within its call stack.

Disadvantages of using a typical RTOS include having to maintain a separate call stack and for each and every task and having to specify upfront how much memory is dedicated to each call stack. FIG. 1 shows three tasks supported by an RTOS, each with its own call stack (108, 110, and 112) and each with its own execution context (102, 104, and 106). Allocating too little memory for a task can cause unpredictable behavior that can be difficult to troubleshoot. Furthermore, significant overhead is required to save and restore execution contexts when switching from one task context to another. Saving and restoring execution contexts, moreover, is dependent on microcomputer architecture, and thus processor specific code must be written for each processor supported by a typical RTOS.

The obvious disadvantage for coroutines is non-deterministic response time. A small, deterministic response time for high priority events and/or tasks is a critical performance measure for multitasking methods. As such, preemptive methods typically outperform cooperative methods. Moreover, coroutines that employ a single stack typically constrain task switching to occur at the task level, not from within subroutines. Two such methods exploited for memory constrained applications include Protothreads, explained by Adam Dunkels, et al. in "Using Protothreads for Sensor Node Programming," from *Proc. of the Workshop on Real-World Wireless Sensor Networks (REALWSN* 2005) and the method shown in U.S. Pat. No. 6,823,517 to Kalman (2004).

The primary disadvantage of using an RTC kernel is added complexity for application code. Although deterministic task handling may be achieved for event-driven systems via hierarchal state handling, the onus for this is passed to the application code. An analysis of the advantages and disadvantages of implementing task-driven vs. event-driven code is provided by Dunkels, et al., in "Protothreads: Simplifying Event-Driven Programming of Memory-Constrained Embedded Systems." The analysis shows that while execution overhead and code size grow slightly for task-driven code, reduction in transition states and lines of code is significant.

What is clearly needed is a multitasking method that supports the benefits of preemption, without the execution overhead introduced by a traditional RTOS and without the complexity for application code introduced by event-driven methods. The following definitions are provided for terms or concepts relevant to describing a solution to this need:

1. application code—software that is not part of a multitasking method, but that is developed for an application that may employ a multitasking method.
2. call stack—memory used for storing return addresses and local variables for hierarchal functions and subroutines called for in software.
3. event occurrence—a notable occurrence or happening within a software application, triggered either internally or externally to the application, upon which task processing depends.
4. execution context—a combination of one or more microcomputer processor registers, including a stack pointer, that determines the execution point within a call stack.
5. event-driven—a descriptor for multitasking methods for which the flow of execution is determined by events.
6. execution overhead—processing that supports a multitasking capability employed by an application, but that is not part of the application code.
7. interrupt—a synchronous or asynchronous event requiring attention in software.
8. mutual exclusion—exclusive access to data that is shared among multiple tasks.
9. nested tail-call—a final subroutine called prior to returning from a tail-call.
10. pend-on-event service—a service that ensures further processing for a task, pending an event occurrence, without supporting task suspension.
11. pending task—a task that is pending on an event occurrence.
12. ready task—a task that is ready to execute.
13. response time—the amount of time that a system takes to respond to an event or signal.
14. running task—a task that is currently executing.
15. semaphore—a task synchronization primitive.
16. signaling—a form of inter-task or interrupt-to-task communication, employed to communicate event occurrences.
17. tail-call—a final subroutine called prior to returning from a function.
18. task completion—a return from a task that preserves neither call stack nor execution context, such that subsequent task processing starts anew.
19. task-driven—a descriptor for multitasking methods whose services allow the flow of execution to be controlled by application code.
20. task handler (or task handling function)—application code that is specified for a task to execute when the task runs.
21. task level—the execution context of a task handler, not including execution within subroutines called from the task handler.
22. task preemption—suspension of a lower priority task such that a higher priority task can be serviced in a timely manner.
23. task scheduler—a multitasking method component responsible for executing tasks.
24. task suspension—preserving an execution context and call stack such that a task may be subsequently resumed.

The foregoing examples of the related art and limitations related therewith are intended to be illustrative and not exclusive. Other limitations of the related art will become apparent to those skilled in the art upon a reading of the specification and a study of the drawings.

BRIEF SUMMARY OF THE INVENTION

This invention is directed to an embodiment of a multitasking method for task-driven applications comprising providing a single call stack, providing a preemptive scheduler which supports synchronous and asynchronous task preemption, providing one or more pend-on-event services (i.e. wait or sleep) which are followed by a return to the scheduler, wherein execution context is not preserved, and providing one or more signaling services (i.e. signal or tick) which may be invoked synchronously from a task handling function and/or asynchronously from an interrupt routine, whereby the scheduler is invoked and execution context is preserved and subsequently restored by the single call stack.

The following embodiments and aspects thereof are described and illustrated in conjunction with systems, tools and methods which are meant to be exemplary and illustrative and not limiting in scope. In various embodiments one or more of the above-described problems have been reduced or eliminated while other embodiments are directed to other improvements. In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWING(S)

FIG. 1 shows three tasks, each operating within its own call stack and execution context.

FIG. 2 shows the three tasks of FIG. 1 operating within a single call stack and execution context.

FIG. 3 shows a procedure for initializing global data specified within the preferred embodiment.

FIG. 4 shows a procedure to initialize a task.

FIG. 5 shows a procedure to initialize a semaphore.

FIG. 6 shows a procedure to start multitasking.

FIG. 7 shows a procedure to execute the highest priority ready task, if it is not already running.

FIG. 8 shows a procedure to reschedule a running task or associate the task with a semaphore that will reschedule the task pending the occurrence of an event.

FIG. 9 shows a procedure to record the occurrence of an event or reschedule a task that is pending on the event, to be performed only from a task.

FIG. 10 shows a procedure for delaying a task without suspending the task.

FIG. 11 shows a procedure for updating the time for delayed tasks and rescheduling tasks for which the specified delay has expired.

FIG. 12 shows a procedure to record the occurrence of an event or reschedule a task that is pending on the event, to be performed only from an interrupt.

Figure 13:
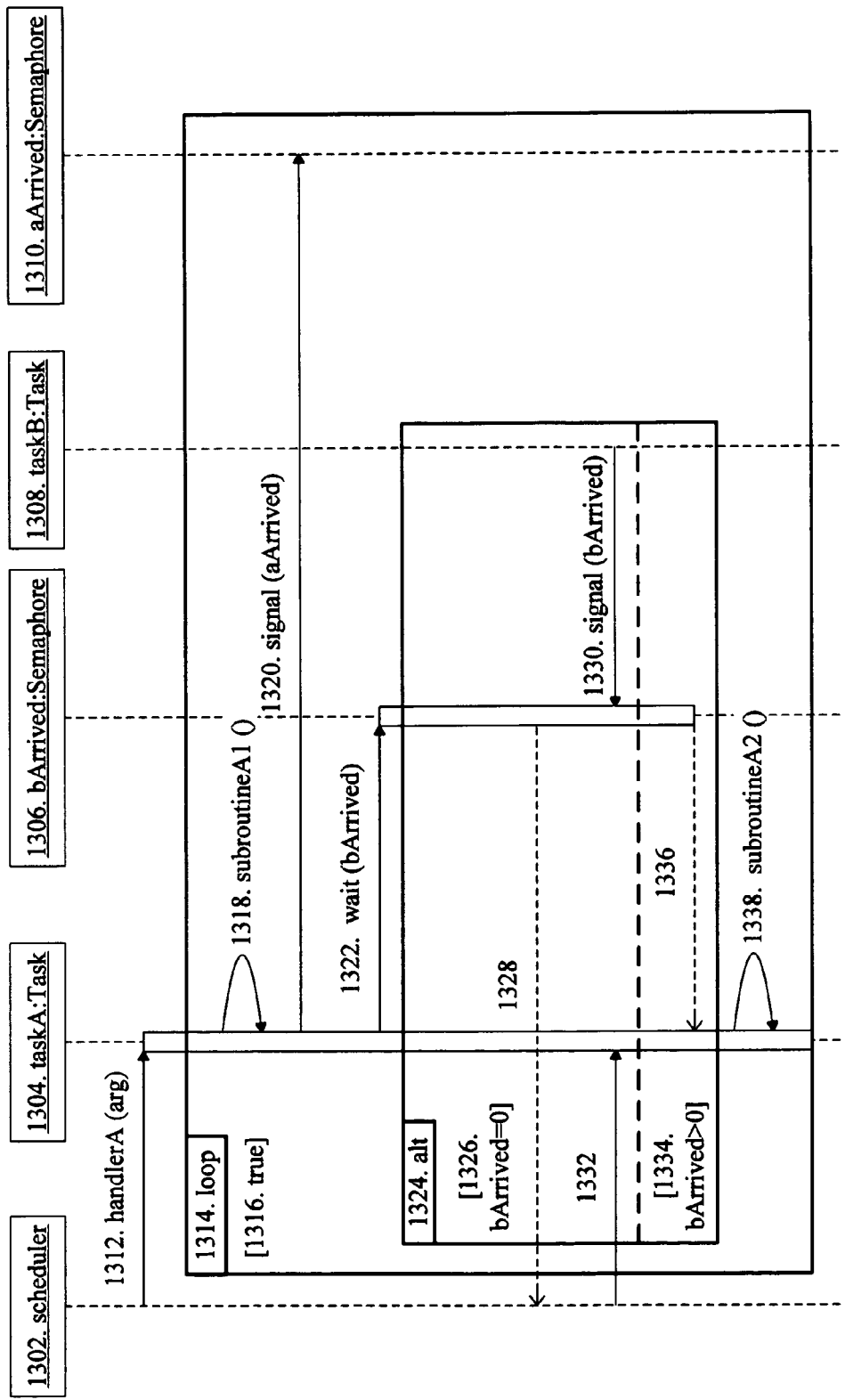
FIG. 13 shows a solution for the Rendezvous problem for use with a typical RTOS.

Exemplary embodiments are illustrated in reference figures of the drawings. It is intended that the embodiments and figures disclosed herein are to be considered to be illustrative rather than limiting.

DETAILED DESCRIPTION OF THE INVENTION

The preferred embodiment provides task-driven, computer multitasking within a framework that constrains task suspension to task preemption. This embodiment comprises a preemptive scheduler (sched_check), two pend-on-event services (sleep and wait), and a call to one of the pend-on-event services each and every time a task must pend on an event occurrence. Other services (tick, signal, and signal_from_isr) work in conjunction with the pend-on-event services. And other services provide for initialization (init, task_init, and sema_init) and multitasking startup (start).

By constraining task suspension to task preemption, preempting tasks can dynamically build upon preempted tasks such that a single call stack and execution context can manage all tasks. FIG. 2 shows the same three tasks as shown in FIG. 1, where task 2 has preempted task 1 and task 3 has preempted task 2. The context of task 1 (7*e*88, f534, 77*de*) is at the bottom of the call stack (204). The context of task 2 (52*d*1, a3*ff*, 4122, 4*c*1*b*, 9*a*2*d*) is stacked above task 1. And the context of task 3 (e33*f*, 214*a*) is currently executing. When task 3 is complete, the execution context (202) pops back to the context of task 2, and when task 2 is complete, the execution context pops back to the context of task 1 (assuming that no further preemptions occur). Note that while the call stacks in FIG. 1 (108, 110, and 112) are fixed in size, the call stack in FIG. 2 (204) grows and shrinks dynamically to fit the tasks that are operating within it.

For the preferred embodiment, task-driven control is supported by pend-on-event services. Although not required for the current invention, it is intuitive that nothing occurs subsequent to a pend-on-event service call until the event has occurred. Therefore, the preferred embodiment restricts pend-on-event services to a tail-call or a nested tail-call. By definition, a tail-call is a final subroutine called prior to returning from a function. See Listing 1 for an example. And a nested tail-call is defined herein as a final subroutine called prior to returning from a tail-call. See Listing 2 for an example.

Listing 1: A tail-call is a final subroutine called prior to returning from a function (lines 4, 9, and 11), where alternate control paths lead to multiple tail-calls.

```
1     void function1 ( void )
2     {
3         subroutine1 ( );
4         subroutine2 ( ); /* tail-call */
5     }
6     void function2 ( int count )
7     {
8         if (count > 0 )
9             subroutine1 ( ); /* tail-call */
10        else
11            subroutine2 ( ); /* tail-call */
12    }
```

Listing 2: The tail-call of subroutine2 is a nested tail-call (a tail-call of a tail-call) for function1.

```
1     void subroutine2 ( void )
2     {
3         do_this ( );
4         do_that ( ); /* nested tail-call */
5     }
6     void function1 ( void )
7     {
8         subroutine1 ( );
9         subroutine2 ( ); /* tail-call */
10    }
```

The pend-on-event services provided by the preferred embodiment are a sleep service that delays further processing for a period of time, and a wait service that delays further processing pending an event signal. These services provide a means for task-driven control. They do not merely register a task for event notification, as is typical of event-driven systems. Therefore, a task must request a pend-on-event service each and every time further processing depends on an event occurrence. As such, control is maintained by task code.

Application Programming Interface—Listing 3

The services provided by the preferred embodiment are few. They have been selected as a means for describing how to implement and make use of the current invention. Listing 3 shows the application programming interface (API) for the preferred embodiment, as written in the 'C' programming language. The API provides core services, typical of a real-time operating system (RTOS), including services for task initialization and task synchronization.

Listing 3: Application programming interface (API) for the preferred embodiment.

```
1     void    init (void);
2     void    sched_check (void);
3     void    sema_init (Sema* handle, int initial_count);
4     void    signal (Sema* handle);
5     void    signal_from_isr (Sema* handle);
6     void    sleep (int ticks, void (*handler)(void*));
7     void    start (void (*idle_task)(void));
8     void    task_init (Task* handle, void (*handler)(void*),
                         void* parameter, int priority);
9     void    tick (void);
10    void    wait (Sema* handle, void (*handler)(void*));
```

The return value of each service is specified first, as void since nothing is returned by the API services. The name of the service is then followed by its input parameters in parenthesis. Input parameters also have types, such as void and int, or specially defined types, such as Task and Sema (defined below). The parameter type is followed by the parameter name, and a comma separates one parameter from another. An asterisk indicates a pointer to a type, void* represents a generic pointer, and the notation void (*f)(void*) represents a pointer to a function, f. Note that the API for the pend-on-event services (lines 6 and 10) supports the specification of a task handler (a pointer to a function) as an entry point for further task processing. Although this specification is not typical for an RTOS, nor required for other embodiments, it is supported by the preferred embodiment because it provides the flexibility to specify a new entry point for the current task. Other embodiments may support a separate service for specification of a new entry point.

Data Structures—Listings 4-5

FIGS. 3-12 show flowcharts for the core services of the preferred embodiment. Before these flowcharts are explained, it is necessary to describe some of the components referred to therein. To this end, Listing 4 shows the data structures for tasks and semaphores, as written in the 'C' programming language.

Listing 4: Data structures for the preferred embodiment.

```
1     struct Task {
2         void (*handler)(void*);
3         void* parameter;
4         int priority;
```

-continued

Listing 4: Data structures for the preferred embodiment.

```
5          int status;
6          int delay;
7       };
8       struct Sema {
9          int count;
10         PQue pending_queue;
11      };
```

The task components (lines 2-6 of Listing 4) include a task handler, a priority, a status, and a delay. The task handler specifies a function pointer (handler) and a corresponding parameter. The priority specifies the priority level of the task within the multitasking method. The status specifies the current task status (i.e. running, ready, or pending). And the delay component is used in conjunction with the sleep service to track the amount of time (or number of ticks) remaining prior to a task running again. The semaphore components (lines 9-10 of Listing 4) include a count and a pending_qeue. The count keeps track of the number of events that occur, and the pending_queue maintains a priority queue of tasks pending on an event occurrence. A priority queue is a common data structure, well known to one skilled in the art of programming.

The flowcharts also refer to global data, although in other embodiments this data need not be global. Listing 5 shows the global data for the preferred embodiment. A priority queue (line 1 of Listing 5) is used to form a queue of tasks that are ready to run (ready_queue). And although there is no variable that indicates which task is running, that task is referred to in the flowcharts as the running_task. The running_task is the highest priority task in the ready_queue being executed by the sched_check service. And finally, a list (line 2 of Listing 5) is employed for those tasks that have been delayed using the sleep service. (Note that for the preferred embodiment, tasks in the sleeping_list have a status of 'pending'.) A list is another common data structure, well known to one skilled in the art of programming.

Listing 5: Global data for the preferred embodiment.

```
1       PQue ready_queue;
2       List  sleeping_list;
```

Flowcharts—FIGS. 3-12

Prior to starting multitasking, it is necessary to initialize global data, tasks, and semaphores using the init, task_init, and sema_init services, respectively. First, the global data is initialized with the init service, according to the procedure shown in FIG. 3. The init (302) service initializes the ready_queue (304) and the sleeping_list (306) and then returns (308). The initialization procedures for these common data structures are well known to one skilled in the art of programming.

Each task is initialized with the task_init (402) service as shown in FIG. 4, according to the input parameters, handle, handler, parameter, and priority. The handle parameter provides access to a task structure (Task), and a dash (-) notation is used herein to reference the components of a structure from a pointer to that structure. The handler, parameter, and priority components (handle-handler, handle-parameter, and handle-priority) are set equal to the handler, parameter, and priority parameters, respectively (404, 406, and 408). The delay component (handle-delay) is set to zero (410), the status component (handle-status) is set to 'ready' (412), and the task (handle) is added to the ready_queue (414). And the service returns (416).

Each semaphore is initialized with the sema_init (502) service as shown in FIG. 5, according to its input parameters, handle and count. The handle parameter is a pointer to a semaphore structure (Sema). The count component (handle-count) is set equal to the count parameter (504), the priority queue (handle-pending_queue) is initialized (506), and the service returns (508). Again, initialization of a priority queue is a procedure well known to one skilled in the art of programming. Each semaphore is initialized once, and the count parameter specifies the initial number of event occurrences.

Tasks typically perform a sequence of operations again and again. Although task-driven task handlers are typically modeled as infinite loops, this is unnecessary for the preferred embodiment. An infinite loop is contained within the start service of the preferred embodiment, and all other tasks build and run preemptively upon it. As shown in FIG. 6, the start (602) service begins with a call to sched_check (604). This call to sched_check runs each initialized task at least once. Next, interrupts are enabled (606). If no other tasks are ready to run, execution defaults to an idle_task, passed as a parameter to the start service. The idle_task is called within an infinite loop, and it runs as the lowest priority task when no other tasks are running (608). The idle_task may be used to calculate and report the percentage of microcomputer processor cycles used by an application. It may also be used to put the microcomputer into low power modes of operation. Note that this service never returns.

A central component of the preferred embodiment is the preemptive task scheduler, sched_check (702). This preemptive task scheduler is invoked within other API services each and every time a new task may have been scheduled. If a newly scheduled task has a higher priority than the currently running task, the new task is executed. The sched_check service is invoked directly only as a tail-call of an interrupt service routine. As shown in FIG. 7, the sched_check service begins by checking if ready_queue (704) is empty. If not, and the status of the highest priority task is 'ready' (706), the following steps are performed: the status of the highest priority task is set to 'running' (708), interrupts are enabled (710), the highest priority task is executed (712), and then interrupts are disabled (714). This process then repeats itself by checking if another task is in the ready_queue. If either of the said conditions (704 and 706) is not satisfied, the sched_check service returns (716). Note: Task execution (712) requires calling the function pointed to by the handler attribute of a task with the parameter attribute as its parameter.

A semaphore is a task synchronization primitive used for interrupt-to-task and inter-task communication. Although a semaphore typically supports non-preemptive task suspension for a traditional RTOS, a semaphore is implemented for the preferred embodiment as a pend-on-event service. The preferred embodiment provides the wait (802), signal (902), and signal_from_isr (1202) services for pending on events and signaling them, respectively. Although wait and signal may also be used for mutual exclusion, they do not prevent priority inversion scenarios in which a low priority task acquires a semaphore required by a high priority task and the low priority task is interrupted by other medium priority tasks. Other embodiments may provide lock and unlock services that preclude priority inversion, wherein task switching is disabled upon acquiring a semaphore and then enabled upon signaling it.

The wait (802) service is requested by application code when continued processing depends on an event occurrence.

And since wait is a pend-on-event service, it is limited to a tail-call or nested tail-call for the preferred embodiment. The handle parameter provides access to a semaphore's components, and the handler parameter specifies an entry point for further task processing. As shown in FIG. 8, wait starts by setting the task entry point (running_task-handler) equal to the handler parameter (804) and disabling interrupts (806). Then if the count component (handle-count) is zero (808), the task status (running_task-status) is set to 'pending' (810), and the running_task is moved from the ready_queue to the semaphore's pending_queue (812). Otherwise, if the count component is nonzero (808), the count is decremented (814), the task status (running_task-status) is set to 'ready' (816), and the running_task is removed from the ready_queue and re-inserted (818). Finally, interrupts are re-enabled (820) and the service returns (822).

The signal (902) service is provided to mark the occurrence of an event from within a task. This service may only be requested from within a task handler (not an interrupt service routine), and it should be requested with interrupts enabled. As shown in FIG. 9, the signal service begins by disabling interrupts (904). If the pending_queue component (handle-pending_queue) is not empty (906), the status of the highest priority task in the pending_queue is set to 'ready' (908), the highest priority task in the pending_queue is moved to the ready_queue (910), and the sched_check service is requested (912). Otherwise, if the pending_queue component (handle-pending_queue) is empty (906) and the count component (handle-count) is less than its maximum value (914), the count component is incremented (916). If the count component has reached its maximum value, an overflow is reported (918). (The method of reporting the overflow is not presented and not relevant to the preferred embodiment. A proper application design will not result in overflows under normal operating conditions.) Finally, interrupts are enabled (920) and the service returns (922).

The sleep (1002) and tick (1102) services are best explained together, as they are interdependent. For the preferred embodiment, sleep is a pend-on-event service and is thus limited to a tail-call or nested tail-call. The sleep service is requested from application code in order to delay further processing. The tick service updates delayed tasks for the preferred embodiment from a timer interrupt routine. The frequency at which the delayed tasks are updated determines the granularity of the sleep service. For example, if the tick service is called every millisecond, tasks may be delayed in units of milliseconds.

FIG. 10 shows the flowchart for the sleep (1002) service. First, the task entry point (running_task-handler) is set equal to the handler parameter (1004). Then, if the delay_in_ticks parameter is greater than zero (1006), the delay component of the running_task is set equal to the delay_in_ticks (1008), the status of the running_task is set to 'pending' (1010), interrupts are disabled (1012), and the running_task is moved from the ready_queue to the sleeping_list (1014). Otherwise, if the delay_in_ticks parameter is not greater than zero (1006), the task status (running_task-status) is set to 'ready' (1016), interrupts are disabled (1018) and the running_task is removed from the ready_queue and re-inserted (1020). Finally, interrupts are enabled (1022) and the service returns (1024).

FIG. 11 shows the flowchart for the tick (1102) service. It is assumed that interrupts are disabled upon entering the tick service, as it is only called from within a timer interrupt. If the sleeping_list is not empty (1104), the following sequence is repeated for each and every task in the sleeping_list: (1) decrement the delay component for a task in the sleeping_list (1106), and (2) if the delay component for the task is zero (1108), move the task from the sleeping_list to the ready_queue and set its status to 'ready' (1110). Once all tasks in the sleeping_list are processed (1112), the service returns (1114).

An interrupt handler is a routine triggered either by an asynchronous event requiring attention or a synchronous event specified in software (i.e. a timer). The way in which interrupt service routines are triggered by interrupt requests depends on microcomputer architecture. Regardless of how an interrupt service routine (ISR) is triggered, the ISR has two main responsibilities: (1) the corresponding interrupt request is acknowledged, and (2) the interrupt is processed. The ISR may require an end of interrupt (EOI) instruction to signal when interrupt processing has completed, depending again upon microcomputer architecture.

For the preferred embodiment, it is assumed that interrupts are disabled when an interrupt service routine is triggered. In order to mitigate high priority interrupt response time, some microcomputers offer interrupt priority schemes that support nested interrupt service routines. A majority of applications can avoid relying on nested interrupts, however, by keeping interrupt service routine processing to a minimum. For the preferred embodiment, it is assumed that interrupts are not enabled during interrupt processing. And thus nested interrupts are not supported. For other embodiments, nested interrupts may be supported.

ISR processing may be minimized by deferring processing to a task handling function. This may be accomplished by communicating an event occurrence within an ISR. The tick (1102) and signal_from_isr (1202) services provide means for event communication from interrupts for the preferred embodiment. FIG. 12 describes the operation of the signal_from_isr (1202) service. The operation is very similar to the signal (902) service. If the pending_queue component (handle-pending_queue) is not empty (1204), the status of the highest priority task in the pending_queue is set to 'ready' (1206), and the highest priority task in the pending_queue is inserted into the ready_queue (1208). Otherwise, if the pending_queue component (handle-pending_queue) is empty (1204) and the count component (handle-count) is less than its maximum value (1210), the count component is incremented (1212). If the count component has reached its maximum value, an overflow is reported (1214). Finally, the service returns (1216).

At interrupt completion, the preferred embodiment restricts interrupt handlers such that their tail-call is the sched_check service. This restriction ensures that if a higher priority task is ready to run following the ISR, that task is executed (within sched_check) before returning to the interrupted task. It is assumed that interrupt processing is complete prior to making the tail-call to sched_check. As such, any tasks that are executed from the sched_check service, prior to returning to the interrupted task, are not considered to be part of the ISR. Finally, it is assumed that interrupts are enabled independently of the preferred embodiment upon returning to the interrupted task.

Figure 14:
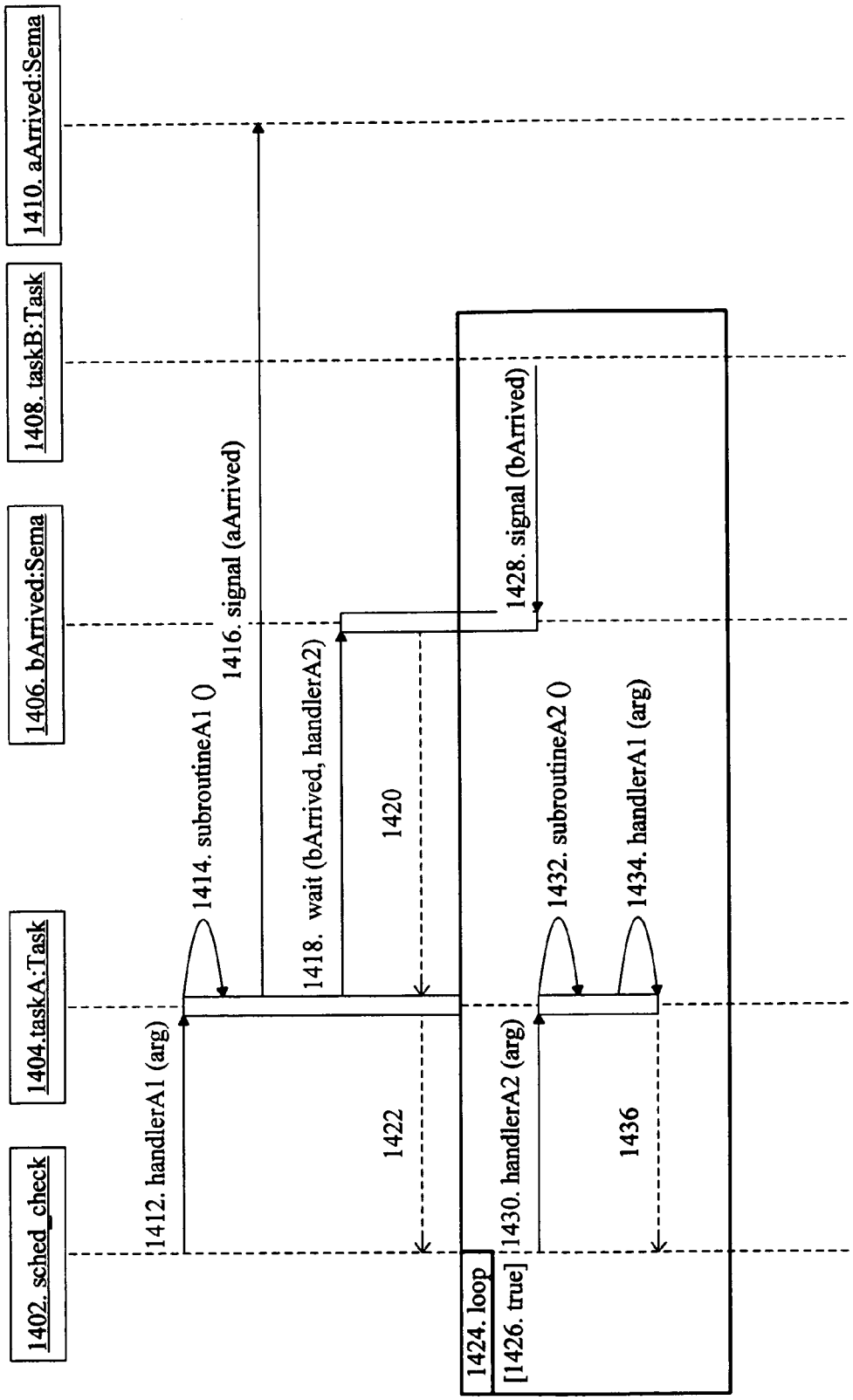
FIG. 14 shows a modified solution for the Rendezvous problem for use with the preferred embodiment.

Operation—FIGS. 13-14

Use of the preferred embodiment may be demonstrated through consideration of a solution to the Rendezvous problem, borrowed from *The Little Book of Semaphores, 2$^{nd}$ Edition,* Copyright 2005, 2006, 2007, 2008 Allen B. Downey. (This book is available online at http://greenteapress.com/semaphores/.) The solution is considered for a traditional RTOS and then modified such that it may be employed within the context of the preferred embodiment. The idea behind the Rendezvous Problem is that two tasks, taskA and taskB, rendezvous at a particular execution point, and neither task proceeds without the other. Consider the task handling functions handlerA and handlerB in Listing 6, and assume that subroutineA2 may not execute prior to subroutineB1 and that subroutineB2 may not execute prior to subroutineA1.

Listing 6: Rendezvous problem - neither taskA nor taskB may proceed beyond its first subroutine without the other task.

```
1    void handlerA ( void* arg )
2    {
3        while ( true )
4        {
5            subroutineA1 ( );
6            subroutineA2 ( );
7        }
8    }
9    void handlerB ( void* arg )
10   {
11       while ( true )
12       {
13           subroutineB1 ( );
14           subroutineB2 ( );
15       }
16   }
```

A solution to the Rendezvous Problem, as provided by Downey, is shown in Listing 7. The solution is supported by two semaphores, aArrived and bArrived, such that each semaphore is signaled in one task and waited for in the other. The solution prevents either task from proceeding without the other. A traditional RTOS can support this solution, as it provides for cooperative task suspension. The preferred embodiment cannot support this solution because task suspension is constrained to task preemption. A simple restructuring of the application code, however, can make the preferred embodiment a viable option. A modified solution that can be supported by the preferred embodiment is presented in Listing 8.

Listing 7: Rendezvous solution for a traditional RTOS - two semaphores, aArrived and bArrived, prevent either task from proceeding beyond its first subroutine without the other task.

```
1    void handlerA ( void* arg )
2    {
3        while ( true )
4        {
5            subroutineA1 ( );
6            signal ( aArrived );
7            wait ( bArrived );
8            subroutineA2 ( );
9        }
10   }
11   void handlerB ( void* arg )
12   {
13       while ( true )
14       {
15           subroutineB1 ( );
16           signal ( bArrived );
17           wait ( aArrived );
18           subroutineB2 ( );
19       }
20   }
```

Listing 8: Modified solution for the preferred embodiment - task handling is accomplished with two handlers per task in order to constrain the wait service to a tail-call or nested tail-call.

```
1    void handlerA1 ( void* arg )
2    {
3        subroutineA1 ( );
4        signal ( aArrived );
5        wait ( bArrived, handlerA2 );
6    }
7    void handlerA2 ( void* arg )
8    {
9        subroutineA2( );
10       handlerA1 ( arg );
11   }
12   void handlerB1 ( void* arg )
13   {
14       subroutineB1 ( );
15       signal ( bArrived );
16       wait ( aArrived, handlerB2 );
17   }
18   void handlerB2 ( void* arg )
19   {
20       subroutineB2( );
21       handlerB1 ( arg );
22   }
```

FIG. 13 shows a sequence diagram for taskA of the Rendezvous Solution provided in Listing 7 for a traditional RTOS. The task handler function handlerA (1312) provides entry into taskA (1304), from which the task enters into a loop (1314). The loop is considered infinite because its condition (1316) is always true. The first action taken within the loop is subroutineA1 (1318), after which the aArrived semaphore is signaled (1320). Then taskA waits on the bArrived semaphore (1322). At this point, taskA may take alternate paths (1324), depending on the count of the bArrived semaphore. If the count of bArrived is zero (1326), the execution context and call stack for taskA are preserved and control returns to the scheduler (1328) such that other tasks may run while taskA waits on the bArrived semaphore. When the bArrived semaphore is signaled by taskB (1330), the execution context and call stack for taskA are restored (1332). Otherwise, if the count of bArrived is greater than zero (1334), taskA returns from the wait service (1336), and the execution of taskA continues. Finally, subroutineA2 is executed (1338), and the process repeats at the beginning of the loop (1314).

FIG. 14 shows a sequence diagram for taskA of the Rendezvous Solution provided in Listing 8 for the preferred embodiment. For the preferred embodiment, taskA is supported by two task handling functions, handlerA1 (1412) and handlerA2 (1430). The sched_check (1402) service enters taskA (1404) initially via handlerA1 (1412). As shown in FIG. 14, the first action of handlerA1 is to execute subroutineA1 (1414). Next, semaphore aArrived is signaled via the signal service (1416), and the wait service is called for semaphore bArrived (1418). The wait service reschedules taskA if the count of bArrived is nonzero. Otherwise, the wait service associates taskA with bArrived, enabling bArrived to reschedule taskA when bArrived is signaled by taskB (1428). Regardless, the wait service specifies handlerA2 as the entry point for further processing and returns to handlerA1 (1420). Then taskA exits handlerA1 and returns to sched_check (1422).

Processing continues when sched_check re-enters taskA via handlerA2 (1430). The first action performed by handlerA2 is subroutineA2 (1432). Then, handlerA2 calls handlerA1 (1434) directly as a subroutine, thus looping back to execute subroutineA1 (1414). Execution of handlerA1 continues (1416) through to its tail-call, wait (1418). This tail-call is a nested tail-call for handlerA2. The wait (1418) service returns to handlerA1 (1420), handlerA1 returns to handlerA2 (1434), and handlerA2 returns to sched_check (1436). This process of entering taskA via handlerA2 repeats each time taskA is the highest priority ready task and is thus depicted within an infinite loop structure (1424, 1426). All tasks execute as such, on a priority basis against the infinite loop backdrop (608) of the start (602) service.

Advantages

From the description of the preferred embodiment, a number of advantages of the current invention become evident:
1) Task-driven control can be provided without the execution overhead associated with supporting multiple call stacks and execution contexts.
2) Preemptive multitasking can be supported without the application code complexity introduced by event-driven methods.
3) A single call stack and execution context can support multitasking without constraining task switching to occur at the task level.

CONCLUSION, RAMIFICATIONS, AND SCOPE

An application developer may use various embodiments of the current invention to provide a multitasking capability without the execution overhead associated with supporting multiple call stacks and execution contexts, without the application code complexity associated with event-driven methods, and without constraining task switching to occur at the task level. While the description of the preferred embodiment has provided specific details regarding its implementation, these details should not be considered as limiting the scope of the invention. For example, constraints and restrictions imposed for the preferred embodiment, such as constraining pend-on-event requests to tail-calls or nested tail-calls, pertain specifically to the preferred embodiment. The scope of the invention should be determined by the claims and their legal equivalents.

While a number of exemplary aspects and embodiments have been discussed above, those of skill in the art will recognize certain modifications, permutations and additions and subcombinations thereof. It is therefore intended that the following appended claims and claims hereinafter introduced are interpreted to include all such modifications, permutations, additions and subcombinations that are within their true spirit and scope.

The invention claimed is:

1. A multitasking method for task-driven applications which employs only a single call stack and constrains task suspension to task preemption, wherein application code of a task-driven application is distributed across a plurality of handling functions, and execution flow of a task of a task-driven application is controlled by assigning a plurality of the handling functions to the task in sequence, the assigning being performed through one or more services requested by the task, the method comprising:

initializing a plurality of tasks, each task including a status, a priority, and an attribute which identifies one of the handling functions as an assigned handling function of the task, wherein the respective priorities of at least two of the tasks are non-identical;

invoking a preemptive scheduler to begin multitasking, wherein the scheduler, whenever invoked, performs a process to execute one of the plurality of tasks comprising:

selecting a task with the highest relative priority of one or more tasks which are not pending on any event and determining the status of the selected task;

setting the status of the selected task to running and calling the assigned handling function of the selected task when the determined status is ready; and returning from the scheduler to resume execution of the selected task using execution context restored from the single call stack when the determined status is running;

requesting, by a task of the plurality of tasks, an assignment service which sets the assigned handling function of the requesting task to a subsequent handling function when executed, wherein the subsequent handling function is specified by the requesting task as part of the request;

invoking the scheduler after executing a wait operation called by a calling task, wherein executing a called wait operation comprises making the calling task pend on an identified semaphore of one or more semaphores, wherein the semaphore is specified by the calling task as part of the call, and wherein execution context of a pending task is not preserved; and invoking the scheduler after processing a triggered signal, wherein, when the triggered signal interrupts an executing task which has a lower priority than the priority of a task made ready by processing the triggered signal, the interrupted task is suspended such that execution context of the interrupted task is maintained on the single call stack.

2. The method of claim 1, wherein the one or more tasks which are not pending on any event are stored in a ready queue.

3. The method of claim 2, wherein making the calling task pend on the semaphore comprises setting the status of the calling task to pending and adding the calling task to a pending queue associated with the semaphore.

4. The method of claim 3, wherein a call triggering the signal specifies a semaphore of the one or more semaphores to be signaled, and wherein processing the signal comprises making one of tasks in the pending queue associated with the semaphore ready.

5. The method of claim 1, further comprising invoking the scheduler after executing a sleep service requested by a requesting task.

6. The method of claim 5, wherein executing the sleep service comprises setting the requesting task to be delayed by an identified number of ticks wherein the number of ticks is specified by the requesting task as part of the request, and wherein execution context of a delayed task is not preserved.

7. The method of claim 6, wherein setting the requesting task to be delayed by the identified number of ticks comprises setting a delay component of the requesting task equal to the identified number of ticks, setting the status of the requesting task to pending, and adding the requesting task to a list of sleeping tasks.

8. The method of claim 7, further comprising a timer interrupt which includes a call to a tick service, and processing the call to the tick service comprises decrementing the delay component of each task in the list of sleeping tasks.

9. The method of claim 8, wherein one or more tasks are removed from the list of sleeping tasks and made ready in response to the respective delay components of the one or more removed tasks being decremented to zero.

10. The method of claim 1, wherein the process to execute one of the plurality of tasks performed by the scheduler further comprises returning from the scheduler and calling an idle service when the status of all of the plurality of tasks is pending.

11. A computer system comprising:
a central processing unit (CPU); and
a memory storage unit comprising computer readable instructions which, when executed by the CPU, cause the system to perform a multitasking method for task-driven applications which employs only a single call stack and constrains task suspension to task preemption, wherein application code of a task-driven application is distributed across a plurality of handling functions, and execution flow of a task of a task-driven application is controlled by assigning a plurality of the handling functions to the task in sequence, the assigning being performed through one or more services requested by the task, the multitasking method comprising:
  initializing a plurality of tasks, each task including a status, a priority, and an attribute which identifies one of the handling functions as an assigned handling function of the task, wherein the respective priorities of at least two of the tasks are non-identical;
  invoking a preemptive scheduler to begin multitasking, wherein the scheduler, whenever invoked, performs a process to execute one of the plurality of tasks comprising:
    selecting a task with the highest relative priority of one or more tasks which are not pending on any event and determining the status of the selected task;
    setting the status of the selected task to running and calling the assigned handling function of the selected task when the determined status is ready; and
    returning from the scheduler to resume execution of the selected task using execution context restored from the single call stack when the determined status is running;
  requesting, by a task of the plurality of tasks, an assignment service which sets the assigned handling function of the requesting task to a subsequent handling function when executed, wherein the subsequent handling function is specified by the requesting task as part of the request;
  invoking the scheduler after executing a wait operation called by a calling task, wherein executing a called wait operation comprises making the calling task pend on an identified semaphore of one or more semaphores, wherein the semaphore is specified by the calling task as part of the call, and wherein execution context of a pending task is not preserved; and
  invoking the scheduler after processing a triggered signal, wherein, when the triggered signal interrupts an executing task which has a lower priority than the priority of a task made ready by processing the triggered signal, the interrupted task is suspended such that execution context of the interrupted task is maintained on the single call stack.

12. The system of claim 11, wherein the one or more tasks which are not pending on any event are stored in a ready queue.

13. The system of claim 12, wherein making the calling task pend on the semaphore comprises setting the status of the calling task to pending and adding the calling task to a pending queue associated with the semaphore.

14. The system of claim 13, wherein a call triggering the signal specifies a semaphore of the one or more semaphores to be signaled, and wherein processing the signal comprises making one of tasks in the pending queue associated with the semaphore ready.

15. The system of claim 11, wherein the multitasking method further comprises invoking the scheduler after executing a sleep service requested by a requesting task.

16. The system of claim 15, wherein executing the sleep service comprises setting the requesting task to be delayed by an identified number of ticks wherein the number of ticks is specified by the requesting task as part of the request, and wherein execution context of a delayed task is not preserved.

17. The system of claim 16, wherein setting the requesting task to be delayed by the identified number of ticks comprises setting a delay component of the requesting task equal to the identified number of ticks, setting the status of the requesting task to pending, and adding the requesting task to a list of sleeping tasks.

18. The system of claim 17, wherein the multitasking method further comprises receiving a timer interrupt which includes a call to a tick service, and processing the call to the tick service comprises decrementing the delay component of each task in the list of sleeping tasks.

19. The system of claim 18, wherein one or more tasks are removed from the list of sleeping tasks and made ready in response to the respective delay components of the one or more removed tasks being decremented to zero.

20. A multitasking method for task-driven applications which employs only a single call stack and constrains task suspension to task preemption, wherein application code of a task-driven application is distributed across a plurality of handling functions, and execution flow of a task of a task-driven application is controlled assigning a plurality of the handling functions to the task in sequence, the method comprising:
  initializing a plurality of tasks including a first task with a first priority and a second task with a second priority which is less than the first priority, each of the tasks including a respective attribute which identifies one of the handling functions as an assigned handling function of the task;
  invoking a preemptive scheduler to begin multitasking;
  calling the assigned handling function of the first task by the scheduler responsive to determining the first task is ready and is the highest priority non-pending task;
  invoking a wait operation by the first task, wherein the first task specifies a semaphore and a subsequent handling function of the handling functions, and wherein a wait operation is only invoked as one of a tail-call and a nested tail-call of a handling function;
  executing the invoked wait operation, the executing comprising setting the assigned handling function of the first task to the specified subsequent handling function, setting the first task as pending on the specified semaphore, and returning to the scheduler, wherein execution context of the first task is not preserved;
  calling the assigned handling function of the second task by the scheduler responsive to determining the second task is ready and is the highest priority non-pending task;
  setting the first task as ready in response to a signal operation specifying the semaphore being called while the second task is being performed;
  invoking the scheduler by the signal operation only if called from one of the handling functions, and otherwise invoking the scheduler by an interrupt which calls the signal operation;

performing a preemptive task switch from the second task to the first task responsive to determining the first task is ready and is the highest priority non-pending task, wherein the execution context of the second task is preserved by the single call stack; and performing a second invocation of the wait operation by the first task following the preemptive task switch, wherein the execution context of the first task is not preserved, and wherein the execution context of the second task is restored from the single call stack by returning from the scheduler after determining that there is no ready task with a priority higher than the priority of the second task.

\* \* \* \* \*